United States Patent
Friedl et al.

(10) Patent No.: US 10,857,481 B2
(45) Date of Patent: Dec. 8, 2020

(54) DISCONTINUOUSLY OPERATING DESUBLIMATOR FOR THE SEPARATION OF PRODUCTS OUT OF GAS MIXTURES

(71) Applicant: KELVION GMBH, Bochum (DE)

(72) Inventors: Werner R. Friedl, Bochum (DE); Frank W. Schmitter, Herne (DE)

(73) Assignee: KELVION GERMANY GMBH, Bochum (DE)

( * ) Notice: Subject to any disclaimer, the term of this patent is extended or adjusted under 35 U.S.C. 154(b) by 615 days.

(21) Appl. No.: 15/547,056

(22) PCT Filed: Jan. 29, 2016

(86) PCT No.: PCT/DE2016/100035
§ 371 (c)(1),
(2) Date: Jul. 27, 2017

(87) PCT Pub. No.: WO2016/119781
PCT Pub. Date: Aug. 4, 2016

(65) Prior Publication Data
US 2018/0021693 A1    Jan. 25, 2018

(30) Foreign Application Priority Data
Jan. 30, 2015 (DE) .......................... 10 2015 101 398

(51) Int. Cl.
*B01D 7/02* (2006.01)
*F28D 7/10* (2006.01)
(Continued)

(52) U.S. Cl.
CPC ............... *B01D 7/02* (2013.01); *F28D 7/106* (2013.01); *F28F 13/12* (2013.01); *F28D 2021/0061* (2013.01)

(58) Field of Classification Search
None
See application file for complete search history.

(56) References Cited

U.S. PATENT DOCUMENTS

| 2,386,298 A | 10/1945 | Downing et al. | |
| 3,609,943 A * | 10/1971 | Richter | B01D 7/02 95/290 |

(Continued)

FOREIGN PATENT DOCUMENTS

| DE | 1203226 B | 10/1965 |
| DE | 1229984 B | 12/1966 |

(Continued)

OTHER PUBLICATIONS

Office Action for Russian Application No. 2017130384/05(052929) dated May 30, 2018; 10pp.
(Continued)

Primary Examiner — Christopher P Jones
Assistant Examiner — Phillip Y Shao
(74) Attorney, Agent, or Firm — Hauptman Ham, LLP (57) ABSTRACT

A discontinuously operating desublimator for the recovery of products from gas mixtures is disclosed having a housing including an inner cooling line and a housing wall, inwardly directed lamellae arranged on an inside of the housing wall which can be cooled for the desublimation of the product by a cooling medium conducted through ducts on the housing wall. The housing is cylindrical and enables the product to be melted down by a change of pressure.

16 Claims, 4 Drawing Sheets

(51) Int. Cl.
*F28F 13/12* (2006.01)
*F28D 21/00* (2006.01)

(56) References Cited

U.S. PATENT DOCUMENTS

| | | | | |
|---|---|---|---|---|
| 4,252,545 | A * | 2/1981 | Haferkorn | B01D 7/02 |
| | | | | 95/271 |
| 5,820,641 | A | 10/1998 | Gu et al. | |
| 6,023,944 | A * | 2/2000 | Blundell | C22B 60/0286 |
| | | | | 62/637 |
| 6,488,745 | B2 * | 12/2002 | Gu | B01D 8/00 |
| | | | | 55/434.4 |
| 2005/0189092 | A1 * | 9/2005 | Jahn | F28F 13/12 |
| | | | | 165/109.1 |
| 2008/0105127 | A1 | 5/2008 | Brothier et al. | |
| 2009/0304890 | A1 * | 12/2009 | Ni | A23L 3/003 |
| | | | | 426/522 |
| 2012/0227939 | A1 * | 9/2012 | Aplienz | F28D 1/0391 |
| | | | | 165/109.1 |
| 2014/0326329 | A1 * | 11/2014 | Zikeli | F16L 53/32 |
| | | | | 137/340 |

FOREIGN PATENT DOCUMENTS

| | | |
|---|---|---|
| DE | 2537639 A1 | 2/1977 |
| DE | 3407104 A1 | 9/1985 |
| DE | 602005006021 T2 | 5/2009 |
| GB | 1172165 A | 11/1969 |
| RU | 2462287 C1 | 9/2012 |

OTHER PUBLICATIONS

International Search Report for PCT/DE2016/100035 dated May 18, 2016, 2 pages.
Office Action for Indian Application No. 201737022062 dated Mar. 27, 2019; 5pp.

* cited by examiner

DISCONTINUOUSLY OPERATING DESUBLIMATOR FOR THE SEPARATION OF PRODUCTS OUT OF GAS MIXTURES

CROSS REFERENCE TO RELATED APPLICATIONS

The present application is a National Phase of International Application Number PCT/DE2016/100035 filed Jan. 29, 2016, and related to and claims priority benefits from German Application Number 10 2015 101 398.3 filed Jan. 30, 2015.

BACKGROUND

1. Field of the Invention

The disclosure is related to a desublimator and a method of operating thereof, and more specifically to a discontinuously operating desublimator for the separation of products out of gas mixtures.

2. Description of the Related Art

DE 34 07 104 A1 discloses desublimators which inside the housing have, instead of ribbed tubes, lamellae which are fastened to the housing side walls. A cooling or heating medium is routed through ducts which are arranged on the outside of the housing side walls. Heat transfer takes place from the ducts onto the housing side walls and to the lamellae. The type of construction of such desublimators has proved appropriate for many years. These desublimators are used, for example, for the production of phthalic anhydride (PSA). The process overpressure typically amounts to 0.1 bar (g) at temperatures of around 170° C. The use of this type of desublimator is restricted by the pressure and temperature of the method. Higher overpressures or underpressures additionally presuppose internal stiffening, particularly in combination with high or low temperatures.

SUMMARY

It is an object of the present invention to provide a desublimator to the effect that it can be operated at higher overpressures or underpressures in combination with high or low temperatures and at the same time the outlay in structural terms is insignificant, so that it becomes possible to use these appliances in other applications (in addition to PSA).

According to one exemplary embodiment, the desublimator operates discontinuously and it serves for the recovery of products from gas mixtures. The desublimator possesses a housing with a housing wall and with inwardly directed lamellae arranged on an inside of the housing wall. The lamellae serve for the desublimation of a product of the gas mixture. The lamellae can be cooled by a cooling medium. The cooling medium is conducted through at least one duct on the housing wall. The heat arising during desublimation is thereby dissipated. In addition, a cooling line is located inside the housing. The cooling line once again enlarges that inner surface of the housing which is in heat exchange with the gas mixture.

In contrast to desublimators of the plate type (DE 34 07 104 A1), the housing of the desublimator is cylindrical. The housing is designed to be flowed through in its longitudinal direction by the gas mixture. The lamellae on the inside of the housing wall, which typically run in parallel at a distance from one another in desublimators of the plate type, in case of a desublimator with a cylindrical housing stand preferably at an angle to one another. They preferably point towards the longitudinal mid-axis of the cylindrical housing. The distance between lamellae adjacent to one another decreases radially inwards due to the cylindrical shape of the housing. The inner ends of mutually adjacent lamellae do not touch one another and also do not come into contact with the inner cooling line.

The inner region of the housing is free of struts which connect mutually opposite regions of the housing walls to one another. Even under a higher internal pressure of more than, for example, 2 bar (g), the housing, due to its cylindrical shape, possesses sufficient rigidity and compressive strength, thus giving rise to a greatly broadened range of use for desublimator technology. A most appreciable advantage is that this form of construction makes it possible, as compared with parallelipipedal boxed shaped housings, to have higher resistance to alternating loads (pressure and temperature). The cylindrical form of construction therefore makes it possible to have operating parameters and operating modes other than those of desublimators with parallelipipedal box shaped housings or with housing walls running essentially parallel to one another.

One challenge in the manufacturing of such a desublimator is to connect the lamellae to the housing wall in a materially integral manner in order to achieve optimal heat transfer. A materially integral connection presupposes accessibility for a welding tool. The cylindrical housing possesses a length of, for example, 700 to 8000 mm with an inside diameter of, for example, 100 mm to 1000 mm. In the case of a length of 8000 mm, therefore, it must still be possible to carry out a welding operation at a distance of approximately 4000 mm from the end of the cylindrical housing. For this purpose, an inner region of the housing must remain free for a welding head which can be displaced in the longitudinal direction of the housing. The cooling tube is positioned later in the region which remains free. The cooling tube may also be designated as a cooling cylinder, depending on its diameter.

However, extended manufacturing possibilities are afforded if the housing is subdivided into a plurality of circumferential segments. Each of the segments, which are, for example, half-shells, is provided individually with lamellae. The segments are subsequently joined together to form the cylindrical housing. One disadvantage of this procedure is that joining connections, particularly welded joints, run in the longitudinal direction of the housing. When a rotationally symmetrical body loaded with internal pressure is subjected to compressive load, higher tangential stresses than stresses in the longitudinal direction always occur. Joining connections which run in the longitudinal direction, such as, for example, weld seams, are therefore subject to higher mechanical loads than joining connections which run in the circumferential direction. The joining connections are therefore subject to high loads.

Alternatively or additionally, it is possible to connect individual cylindrical length portions to one another to form a housing. In this procedure, advantageously, seamless tubes can be used for each individual length portion. However, joining the individual length portions together may be somewhat more complicated when a duct for the cooling medium is to be continued in the adjacent length portion.

The term "length portion" is to be understood in the context of this invention to mean not only a length portion of a cylindrical housing, which is to be connected to a following length portion, but, in general, a region with a specific function or configuration, for example with a specific arrangement, geometry or number of lamellae or with specific cooling ducts or cooling possibilities.

The term "duct" stands for a line portion through which the cooling medium can flow and which extends at least over a subregion of the circumference and/or of the length of the housing of the desublimator. A plurality of these ducts may run parallel to one another in the longitudinal direction or circumferential direction of the housing. The run may be meander-like or helical. It is also possible for the housing to be of double-walled design, so as to give rise to an annular space which serves as a duct. In a type of construction with half-shells, for example, the half-shells may be of double-walled design, so as to form annular-space segments which serve in each case as a duct for the cooling medium. A duct does not necessarily extend from an inlet end to an outlet end of the overall housing. A duct may also extend only over a single length portion or a plurality of adjacent length portions of the housing. With regard to mechanical load-bearing capacity, housings which are continuous in the longitudinal direction and the circumferential direction are the best option, since there are no weak points caused by longitudinal seams or peripheral seams. In particular, seamlessly drawn tubes are suitable.

In an advantageous development of the invention, an inner cooling line, in particular a single inner cooling line, with outwardly directed lamellae is arranged in the housing. The cooling line is arranged, in particular, so as to run centrally in the longitudinal direction of the cylindrical housing. In the case of such a cooling line, the lamellae preferably extend in a star-shaped manner from the inside outwards. In the case of a cooling line, too, it is desirable to fasten an especially large number of lamellae in specific length portions, this being simpler, in principle—than with lamellae directed inwards.

Preferably, the outwardly directed lamellae on the inner cooling line and the inwardly directed lamellae on the housing wall are arranged so as to be distributed uniformly, within a length portion, over the circumference of the cooling line or of the housing. The uniform distribution of the lamellae makes it possible to have in each case, as seen over the circumference of a length portion, a uniform discharge of heat and also a uniform settlement of the product. The efficiency of the method is improved by the discontinuously operating desublimator being laden uniformly.

In a preferred refinement of the invention, the housing possesses length portions coolable which can be cooled separately from one another. The length portions may nevertheless be connected to a common cooling system, but different temperatures for cooling and/or heating can be set in the individual length portions via actuating and/or regulating means.

The desublimator may preferably be heated via the same ducts through which a cooling medium is conducted. That is to say, the management of the temperature of the desublimator takes place via the ducts on the housing wall and/or the at least one inner cooling line.

In the inlet region of the gas stream into the housing, the gas mixture possesses the highest concentration of the product to be recovered. A relatively large quantity of the product to be recovered therefore settles on the lamellae in the inlet region of the housing. The settled product acts in the same way as a thermal insulator on the lamellae, so that increasingly less heat energy can be extracted from the gas mixture particularly in the heavily laden inlet region. The local cooling capacity falls.

The invention provides for increasing the cooling capacity in at least one length portion downstream in the direction of flow of the gas mixture, in that the surface of the lamellae increases, in particular the number of lamellae is increased.

In a preferred refinement, the inwardly directed lamellae run radially straight from outside inwards, or vice versa, and the outwardly directed lamellae run radially straight from inside outwards. This arrangement may be designated, at least with regard to the lamellae on the cooling line, as star-shaped because of the radial orientation of the individual lamellae.

In a development, in each case free ends of inwardly directed lamellae lie directly opposite the free ends of the outwardly directed lamellae. The inner and outer lamellae do not in this case touch one another.

A further improvement in performance can be achieved if the surface of the lamellae increases from an inlet end of the housing to an outlet end of the housing. The inlet end may be an upper or a lower end of the desublimator.

The increase in the surface takes place with a factor of between 1 and 10. The increase may take place by means of an enlargement of the rib surface per unit length, for example by means of a profiling. A profiling may be formed by waves or beads, or else bulges, dimples, orifices or embossings. Additional devices may also be arranged on an individual lamella, the number and size of these additionally arranged devices increasing in the direction of flow of the desublimator.

Instead of or in addition to the enlargement of the surfaces of an individual lamella, additional lamellae may be provided. Preferably, the desublimator possesses in the direction of flow of the gas mixture at least two successive length portions, the number of lamellae increasing from length portion to length portion. Preferably three or more length portions, in particular 4 to 8, are provided.

For example, there is a first group of lamellae which extend in a constant length and arrangement over the entire height region of the desublimator. This does not mean that a lamella is necessarily exactly as long as the overall desublimator. On the contrary, the lamellae preferably extend only over a limited length of, for example, 100 mm to 1000 mm. The shorter lamellae can be handled more easily and are not warped to such a great extent when being welded to the housing wall. A further lamella may then be arranged in alignment with a preceding lamella. The aligned lamellae give rise as a whole to a lamella arrangement along which the gas mixture flows.

Additional lamellae to this first group of lamellae may be arranged in a middle height region of the desublimator and likewise extend as an arrangement of a plurality of aligned lamellae as far as the outlet end of the desublimator. The number of lamellae may, for example, be doubled. These lamellae may be both inwardly directed and outwardly directed lamellae.

Finally, further lamellae, for example lamellae of smaller height, may also additionally be arranged in a further height region (intermediate lamellae). These lamellae may be, in particular, inwardly directed lamellae which are fastened to the housing wall. The height of the lamellae is to be measured in the radial direction of the cylindrical housing. This stepped arrangement takes into account the notion that an especially large quantity of the product is already precipitated on the lamellae in the inlet region of the housing. The gas mixture therefore then contains a smaller fraction of the product. In order to achieve an increased precipitation of products, the surface of the lamellae may be enlarged. Depending on the application, the ratio of the surfaces between the inlet region and the outlet region of the desublimator therefore lies, in particular, in a range of 1:1 to 1:8, in particular in the range of 1:1 to 1:6 and particularly in a range of 1:3 to 1:4.

The desublimator according to the invention possesses a distributor chamber on the entry side in order to distribute the substance streams uniformly to all the lamellae. A suitable collecting chamber is arranged in the exit region.

The housing of the desublimator is cooled from outside via the housing wall. The surface of the housing wall is substantially larger than the surface of the inner cooling line. Preferably, therefore, more lamellae are arranged on the housing wall than on the inner cooling line.

The inside diameter of the housing preferably lies in a range of 100 to 1000 mm, in particular of 400 to 800 mm.

The lamellae lying opposite one another may vary and, in particular, alternate in their height from length portion to length portion. As a result, the gas mixture, when it passes from one length portion into the next, is to be deflected and the formation of corridors is thus to be avoided.

The individual lamellae should possess a height of approximately 100 to 150 mm for thermodynamic reasons. The exception to this is intermediate lamellae which may have a smaller height as a consequence of construction. Lamellae, directly opposite which a lamella on the cooling line is not arranged, are designated as intermediate lamellae.

The lamellae may be arranged so as to be offset slightly to one another in the circumferential direction in their sequence. As a result, at each circumferential offset, the flow impinges upon the end face of a lamella, thus leading to the desired settlements of the product on the end face, too, and once more improving the degree of precipitation.

Orifices in the lamellae, for example slots running transversely to the direction of flow in the lamellae, may have a similar effect. By means of such slots, the mainly laminar flow is to be broken up in order to generate turbulences. Moreover, the flow may in this case pass from one side of a lamella onto the other side. In the same way, the lamellae may be provided with turbulators or other elements suitable for breaking up a laminar flow.

The lamellae are preferably designed in adaptation to the vapour pressure curve of the product to be recovered. This refers, above all, to the number of lamellae in the respective length portions. If, for example, they are distributed on six length portions, the number n of lamellae on the housing wall, starting from the inlet side, may amount to n/2n/3n/4n/5n/5n. Preferably, as many lamellae are arranged on the exit side as can still be fastened to the housing wall in manufacturing terms.

If additional lamellae are arranged in the region of a middle length portion of the desublimator, a crystalline product, which may be in the form of fine needles, settles on the end faces of the lamellae. These needles may be entrained by the dynamic pressure of the gas flow, but would then catch on the end faces of lamellae in the following length portion and settle on them. The last length portion therefore also serves functionally, above all, as a filter, but without being designed as a separate filter component.

The lamellae are preferably connected to the housing by means of a laser welding method. The laser beam can execute a relatively broad travel between the lamellae, without being obstructed by the short distance between mutually adjacent lamellae. By means of a suitable welding head, up to 20 cm can be bridged from the welding head to the joining zone. This makes it possible to fasten the lamellae to the housing wall and to the cooling tube by welding so that the lamellae stand closely next to one another.

Depending on the desired flow routing, the invention does not rule out a situation where the lamellae running, in principle, radially are set obliquely and a somewhat spiral or helical flow routing is thereby brought about. Directions of flow which alternate in the circumferential direction are also possible.

On account of the comparatively low flow velocities, also, only limited substance streams can be routed through a single desublimator. In an advantageous development, therefore, the invention provides for connecting a plurality of such desublimators in parallel. In parallel connection, the desublimators can be acted upon in total with larger substance streams.

When the desublimators have received so much product that further loading is ineffective, the second phase of the recovery process, to be precise the removal of the product, follows after the first phase. The product can be removed by a change of pressure inside the desublimator and/or by an increase in temperature of the cooling medium. A change of pressure causes a phase change of the product. The product preferably passes from the solid to the liquid phase and flows independently downwards out of the desublimator as a result of gravity. Passage into the gas phase is also possible. The advantage of this procedure (change of pressure) is that the temperature of the housing can be kept constant. The energy losses are in this case substantially lower than in the method in which the pressure is kept constant and the temperature is increased. Of course, a higher temperature, just like the change of pressure, causes a meltdown of the recovered product.

The invention also provides in addition to an individual desublimator a desublimation arrangement. A desublimation arrangement comprises at least two desublimators. A first desublimator is acted upon, for example, with a gas mixture and is at the same time cooled to an extent such that the product settles, while simultaneously a further desublimator is melted down, in which the settled product passes into the preferably liquid phase and is removed from the desublimator. In the next step, the two desublimators exchange their tasks, so that corresponding desublimation products can be recovered and the gas mixture purified in constant alternation.

In an especially preferred refinement, the desublimation arrangement possesses not only two individual desublimators, but groups of desublimators which are arranged in parallel connection and can be acted upon in each case with the gas mixture. Just as in the case of individual desublimators, each of the groups is provided for alternately recovering products by desublimation and subsequently melting down the already recovered product by a change of pressure and/or an increase of temperature, actuating means being provided for the alternate delivery of the gas mixture to the respective group of desublimators.

In a development of the invention, a plurality of desublimators may be arranged in series connection. That is to say, the gas stream runs first through a first desublimator and then through at least one further desublimator. As a result, the construction length of the individual desublimators can be limited and the degree of product precipitation increased. The series-connected desublimators operate according to the same principle, but may differ from one another in their set-up, since markedly less product is already contained in the gas mixture in a following, that is to say downstream desublimator. In the downstream desublimator, therefore, although less product settles, nevertheless the risk that an individual flow path between adjacent lamellae is constricted or even blocked by deposits of the product is much lower than in the upstream desublimator.

Desublimators of this type may be used, in particular, in connection with the desublimation of carbon dioxide from natural gases or biogases.

BRIEF DESCRIPTION OF THE DRAWINGS

The invention is explained in more detail below by means of an exemplary embodiment illustrated in the diagrammatic drawings in which.

In the figures, the same reference designations are used for identical or similar components, even if a repeated description is omitted for reasons of simplicity.

DETAILED DESCRIPTION OF SOME EMBODIMENTS

Some embodiments will be now described with reference to the Figures.

Figure 1:
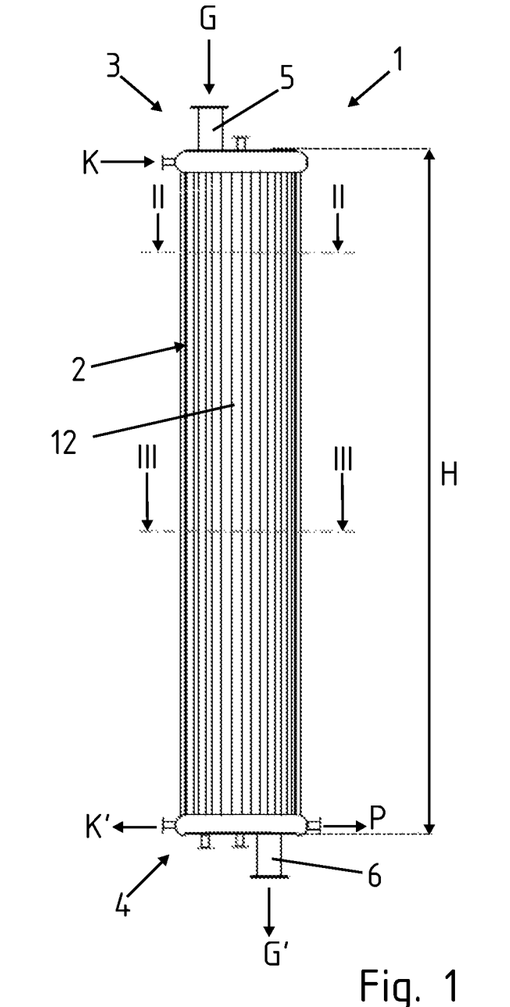
FIG. 1 is a side view of a desublimator.

FIG. 1 shows a desublimator 1 with an elongate cylindrical housing 2. The illustration shows the operating position of the desublimator 1. It possesses an upper region, which in this case serves as an inlet region 3, and a lower region, which serves as an outlet region 4. The direction of flow is vertical from the top downwards, that is to say from the inlet region 3 to the outlet region 4. There are two substance streams. A gas mixture G is introduced via the inlet region 3 into the interior of the housing 2 via a connection piece 5. The purified gas mixture G' can be drawn off again at the outlet end 4 via an outlet connection piece 6. The height difference between the inlet region 3 and the outlet region 4 amounts to H=700 mm to 8000 mm. The gas mixture G is introduced, distributed uniformly over the cross section, into the housing 2. The second substance stream is a cooling medium K which, in this exemplary embodiment, flows in co-current to the gas mixture G.

Figure 2:
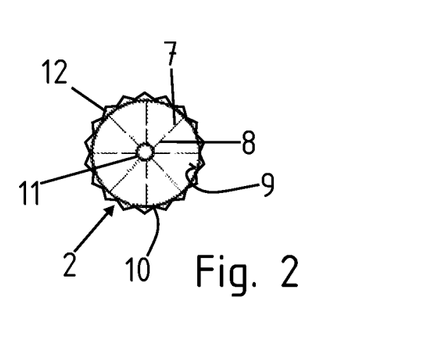
FIG. 2 is a cross-sectional view of the desublimator of FIG. 1 taken along the line II-II.

FIG. 2 shows that the housing 2 is subdivided inside into circle sectors of equal size in a star-shaped manner. There are eight circle sectors of equal size which are formed by lamellae 7, 8. On an inside 9 of the housing wall 10 of the housing 2, there are overall eight lamellae 7 directed radially inwards. Moreover, there is a central inner cooling line 11, to which eight lamellae 8 directed radially outwards are likewise fastened. The cooling line 11 has a circular cross section. The lamellae 7 and 8 lie in each case directly opposite one another, without touching one another. The radially inwardly directed lamellae 7 are dimensioned somewhat longer in this sectional plane than the radially outwardly directed lamellae 8 on the inner cooling line 11. The lamellae 7, 8 are formed by segments of lamellae which succeed one another in the axial direction of the housing 2 and are therefore located in different length portions of the housing 2. The segments may have a length of 100 mm to 1000 mm. The lamellae 7, 8 possess a width of 0.8 mm to 5 mm, in particular of 1 mm to 3 mm, and are connected, in particular welded by laser welding, to the housing wall 10 or to the cooling tube 11 in a materially integral manner.

The lamellae 7, 8 serve for receiving a product from the gas mixture G. For this purpose, the lamellae 7, 8 are cooled. This takes place by means of ducts 12 which are arranged on the circumference of the housing 2 and via which a cooling medium K can be brought directly into contact with the housing wall 10. The ducts 12 are triangular in cross section. They are arranged so as to be distributed uniformly over the circumference of the housing wall 10. The temperature of the cooling medium K increases in the direction of flow of the cooling medium K. The cooling medium K flows in the same direction as the gas mixture G. So much heat is extracted from the gas mixture G that the product to be recovered settles on the lamellae 7, 8. This sublimation process is continued until further settlement is no longer worthwhile economically or until the desired degree of purity of the gas mixture G is reached. The purified gas mixture is identified as G'. The heated cooling medium is identified by K'.

In the second step, the gas stream G is interrupted and the product P is melted down. This may take place in that the pressure inside the desublimator 1 is changed. Alternatively or additionally, the temperature of the cooling medium K can be increased. In either case, the product P is changed into its preferably liquid phase and flows automatically as a result of gravity downwards where it can be drawn off as a preferably liquid product P from the housing 2. Subsequently, the temperature of the cooling medium K is lowered again and/or the pressure inside the housing 2 is changed again to an extent such that the conditions for the formation of further product P on the lamellae 7, 8 are established. The process then commences from the beginning in that gas mixture is delivered once again.

In this exemplary embodiment, the desublimator 1 possesses six different length portions which extend in each case over about ⅙ of the height H of the desublimator 1. In the upper sixth, the desublimator 1 is provided, for example, with a first number of lamellae 7, 8, for example with in each case eight inwardly directed and eight outwardly directed lamellae 7, 8. The number of inwardly directed lamellae 7 depends on the sequence n/2n/3n/4n/5n/5n with n=8. The number of lamellae in the fourth sixth therefore amounts to 4×8=32, so that the surface of the lamellae 7, 7', 8 increases greatly in the direction of flow.

Figure 3:
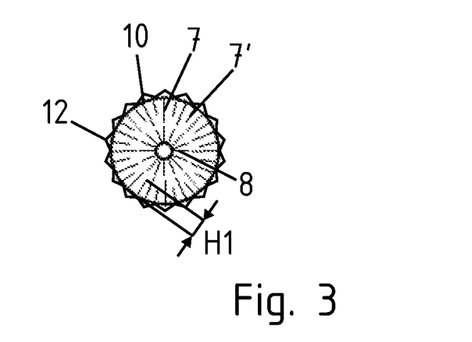
FIG. 3 is a cross-sectional view of the desublimator of FIG. 1 taken along the line III-III.

FIG. 3 shows a sectional illustration through the desublimator 1 of FIG. 1 along the line III-III. It can be seen that, in this sectional plane, substantially more lamellae 7, 8 are arranged in the fourth sixth nearer to the outlet end 4. The number of higher lamellae 7, 8 has doubled, as compared with those in the upper sectional plane. In addition, a further lamella 7' with a different geometry has been added. These lamellae 7' are shorter, as measured in the radial direction, and possess a somewhat smaller height H1 than the lamellae 7, 8 explained above. Furthermore, no lamella on the cooling line 11 lies opposite the shorter lamellae 7' which are fastened to the housing wall 10. Conversely, a lamella 7 on the housing wall 10 lies opposite each lamella 8 of the cooling line 11.

Figure 4:
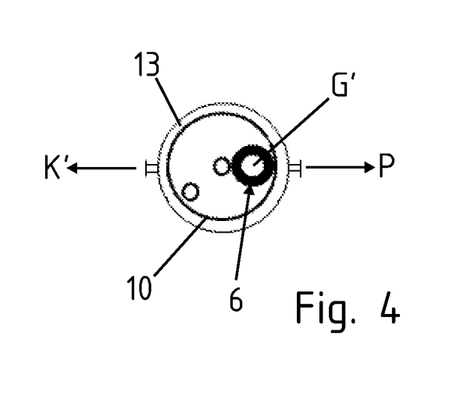
FIG. 4 is a bottom view of the desublimator of Figure.

FIG. 4 shows the desublimator of FIG. 1 from below. It can be seen that, on the left in the image plane, a connection piece is provided, via which the heated cooling medium K' emerges. On the right in the image plane, the liquid product P can be discharged via the connection piece illustrated. The purified gas mixture G' emerges downwards via the outlet connection piece 6. Furthermore, an annular chamber 13 can be seen, which surrounds the housing wall 10 on the outside and in which the heated cooling medium K' collects.

Figure 5:
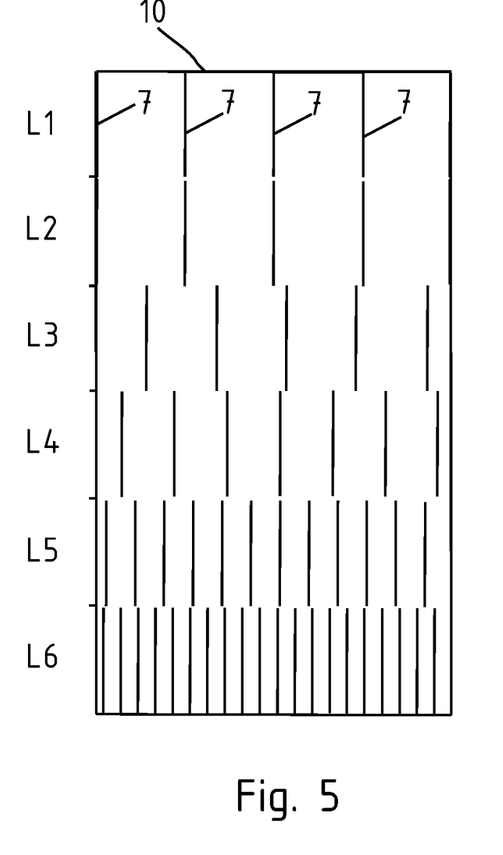
FIG. 5 shows a view of the lamellae on a laid-out housing wall of a desublimator in a first embodiment.
Figure 6:
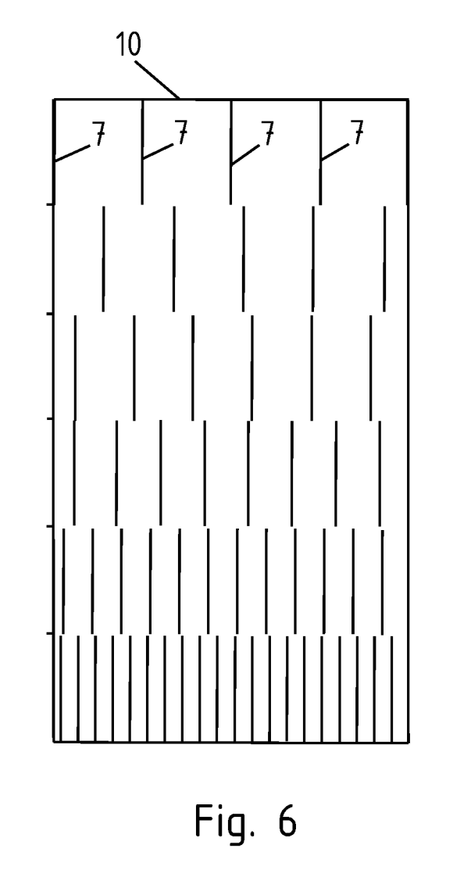
FIG. 6 shows a view of the lamellae on a laid-out housing wall of a desublimator in a second embodiment.
Figure 7:
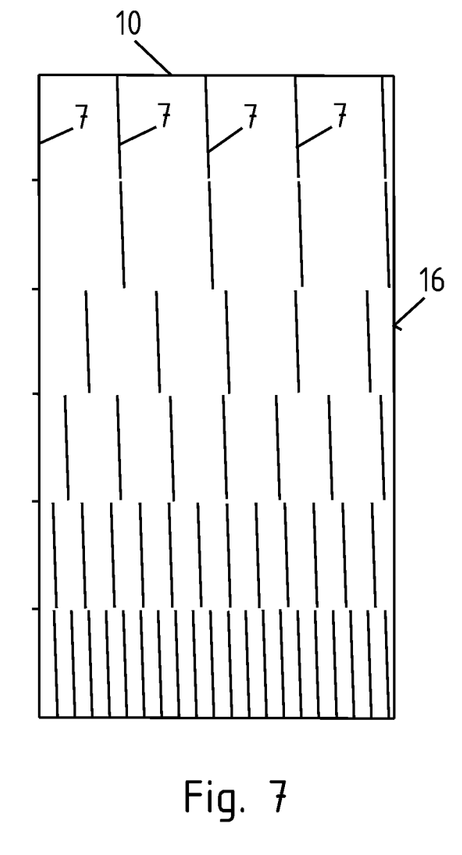
FIG. 7 shows a view of the lamellae on a laid-out housing wall of a desublimator in a third embodiment.

FIGS. 5 to 7 show in each case a laid-out view of a housing 2 provided with lamellae 7, with the direction of observation onto the inside of the housing 2, that is to say onto the lamellae 7 on the housing wall 10. In each case the inlet region is at the top in the image plane. The outlet region is at the bottom. Between the upper end and the lower end there are overall six length portions L1-L6 of equal length. The length portions L1-L6 have in each case a specific number and arrangement of lamellae 7, the number in the last length portion L6 being larger than that in the first length portion L1.

FIG. 5 shows that the number of lamellae 7 does not necessarily have to increase from length portion to length portion. In concrete terms, the number of lamellae 7 in the first two length portions L1, L2 amounts in each case to four. In the following length portions L3 to L6, the number amounts to 5, 7, 12 and 20 lamellae 7.

The exemplary embodiment of FIG. 6 differs from FIG. 5 in that the number of lamellae 7 already increases between the first two length portions L1 and L2. In concrete terms, the number amounts to 4, 5, 6, 8, 12, 20 lamellae 7 in the respective length portions L1 to L6.

The exemplary embodiment of FIG. 7 corresponds in terms of the number of lamellae 7 to that of FIG. 5. The difference is that the lamellae 7 are arranged at a slight inclination, that is to say stand at a preferably acute angle to the longitudinal edge 16 of the laid-out housing wall 10. This corresponds in a cylindrical arrangement to a spiral or helical arrangement. The flow path of the gas mixture G can thereby be prolonged. In a way not illustrated in any more detail, the number of lamellae 7 may also increase on the cooling line 11. The lamellae 7 on the cooling line 11 may also be arranged spirally.

Figure 8:
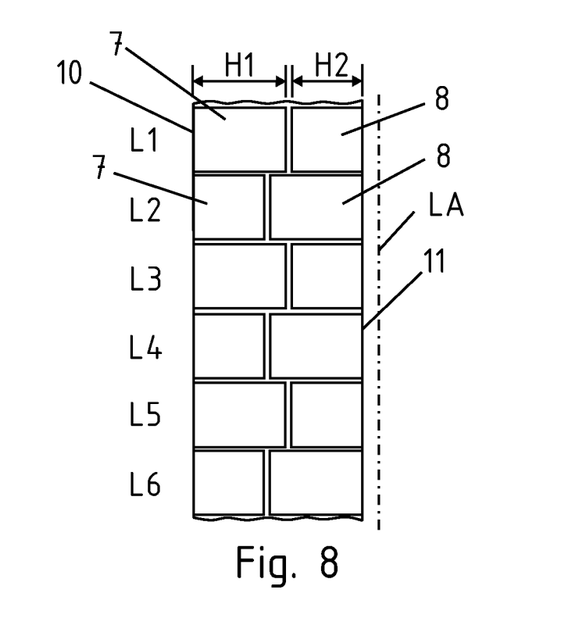
FIG. 8 shows a subregion of a longitudinal section through a desublimator.

FIG. 8 shows a subregion of a desublimator in longitudinal section with the direction of observation onto the lamellae 7, 8. Located on the right in the image plane is the longitudinal mid-axis LA of the housing 2 which runs through the cooling line 11. The housing wall 10 is located on the left in the image plane. Lamellae 7, 8 in six length portions L1 to L6 are illustrated. The inwardly directed lamella 7 in the first length portion L1 has a first height H1 and the opposite, outwardly directed lamella 8 has a greater height H2. In the following length portion L2, the ratio H1/H2 is reversed. In the following length portions L3 to L6, this alternation is continued in the same way. The formation of corridors in the region of the mutually opposite ends of the lamellae 7, 8 is thereby avoided.

Figure 9:
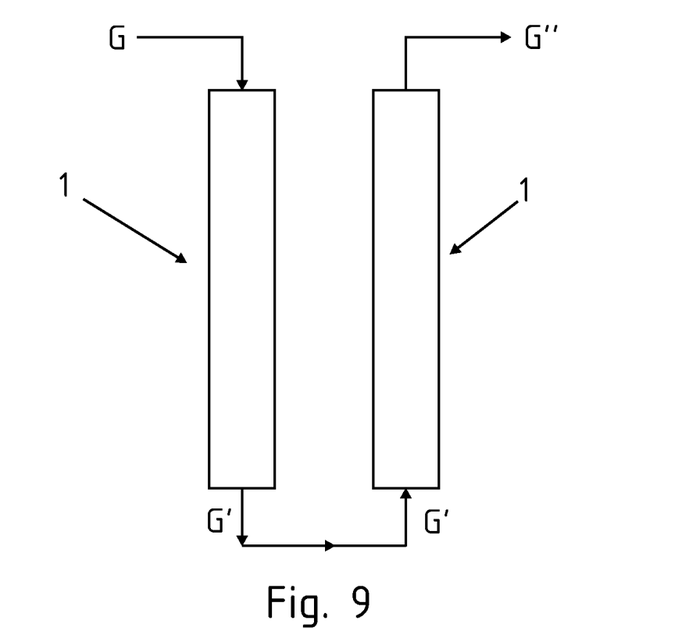
FIG. 9 shows two desublimators in series connection.

FIG. 9 shows a series connection of two desublimators 1. The gas mixture G enters the first desublimator 1 from above. The purified gas mixture G' emerges at the bottom and is delivered from below to a further desublimator 1, from which it emerges at the top as a further-purified gas mixture G". The illustration makes it clear that the inlet end of the desublimator 1 does not necessarily have to be the upper end of the housing. Furthermore, the downstream second desublimator 1 may differ in its internal set-up from the upstream first desublimator 1, particularly in the number of lamellae 7, 8.

Figure 10:
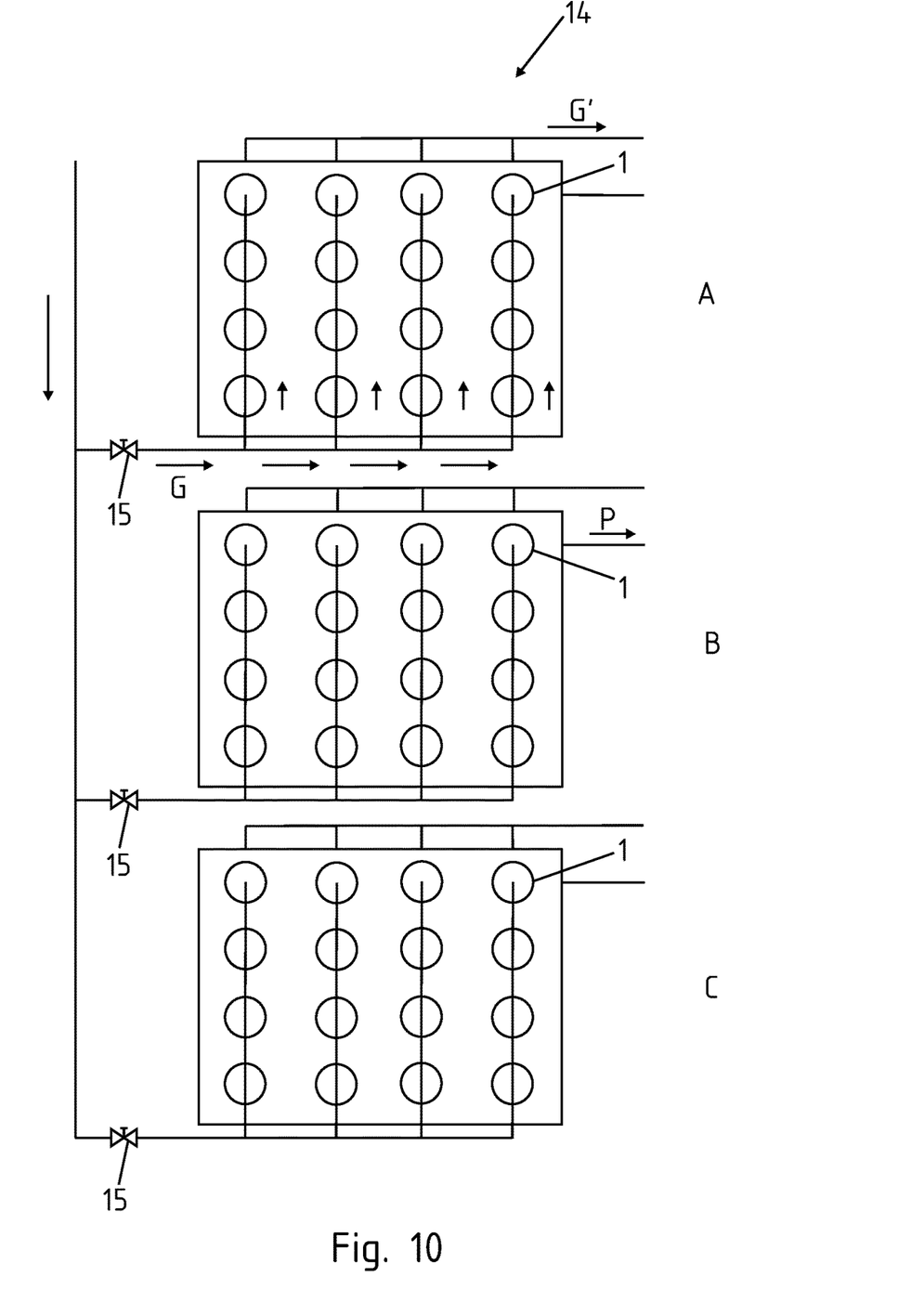
FIG. 10 shows a desublimation arrangement with a plurality of desublimators in a view from above.

FIG. 10 shows a desublimation arrangement 14 with three groups A, B, C of structurally identical desublimators 1. The individual groups A, B, C can in each case perform the same production stages, such as are explained below.

It can be seen that the gas mixture G is first delivered only to the first group A. The purified gas mixture G' emerges from the group A of desublimators 1. Meanwhile, the product settles on the individual lamellae of the desublimators 1. This process takes place over a specific preset period of time. The product is subsequently to be melted down. The second group B of desublimators 1 is in this phase simultaneously. It can be seen that the delivery of gas mixture G to the second group B has been interrupted via an actuating means 15. In a way not illustrated in any more detail, the pressure inside the individual desublimators 1 has been varied and/or the temperature of the cooling medium increased, so that the liquid product P can be recovered.

The pressure subsequently has to be varied again and/or the temperature lowered again. The group C of desublimators 1 is in this phase simultaneously. In this phase, neither gas mixture G is delivered nor product is recovered. The actuating means 15 is closed.

When the gas mixture G' from the first group A cannot be purified any further, the actuating means 15 which is the lower in the image plane is opened to the group C and is closed to the group A. The group A is then transferred into the state in which the product P is melted down, that is to say the group A then assumes the function of group B, while group B is cooled again to a greater extent and/or its internal pressure is varied, so that, after the conclusion of the desublimation process in group C, this task can be assumed by group B. A continual flow is thus obtained, without the delivery of the gas mixture G having to be interrupted. Such a desublimation arrangement 14 possesses a throughput which is higher by a multiple than the operating mode with only a single or with two parallel-connected desublimators 1. In the concrete exemplary embodiment, there are 16 desublimators per group. The number chosen here by way of example is not restrictive. Any other number of desublimators 1 is possible.

Further groups may also be provided in order to afford alternative possibilities. Moreover, individual desublimators 1 in the respective groups A can be connected and disconnected individually, whether for maintenance purposes or in order to adapt the capacity of the plant. The advantage of such an arrangement is that it can be scaled to a high degree in that a larger or smaller number of structurally identical desublimators 1 is used. Entire batteries of desublimators may be connected in three, six or even more groups.

Another embodiment provides a desublimation arrangement of at least two groups. However, three or even more groups, which can in each case be connected differently, are perfectly possible. Furthermore, the desublimation arrangement according to the invention provides a control arrangement, not illustrated in any more detail, for controlling the actuating means 15 or the cooling media and the liquid product streams and also, in a way not illustrated in any more detail, measuring and control devices for monitoring and influencing the process.

The parallel connection, illustrated in FIG. 10, of desublimators 1 may be supplemented by a series connection, that is to say each of the groups A, B, C comprises a plurality of series-connected desublimators, while the groups A, B, C are connected in parallel to one another.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A discontinuously operating desublimator for the recovery of products from gas mixtures, the desublimator comprising:
 a housing having a housing wall;
 inwardly directed lamellae which are arranged on an inside of the housing wall and configured to be cooled, for the desublimation of the product, by a cooling medium which is conducted through ducts on the housing wall,
 wherein the housing is cylindrical, and is configured to allow the gas mixture to flow through in a longitudinal direction,
 wherein at least one inner cooling line is arranged in the longitudinal direction in the housing and over an entire length of the housing, the inner cooling line having outwardly directed lamellae that are arranged spaced apart over a circumference of the inner cooling line in a circumferential direction of the inner cooling line,
 wherein each of the outwardly directed lamellae are fixed to the inner cooling line in the longitudinal direction of the housing, and
 wherein the number of inwardly directed lamellae and/or of outwardly directed lamellae increases from an inlet end of the housing to an outlet end of the housing.

2. The desublimator of claim 1, wherein the at least one inner cooling line comprises a single cooling line extending centrally in the longitudinal direction of the housing.

3. The desublimator of claim 1, wherein the housing has a plurality of length portions succeeding one another in the direction of flow of the gas mixture, the outwardly directed lamellae on the inner cooling line and/or the inwardly directed lamellae on the housing wall being arranged, within each of the length portions, so as to be distributed uniformly over the circumference of the inner cooling line and/or of the housing.

4. The desublimator of claim 1, wherein the inwardly directed lamellae extend radially straight from the housing wall inwards towards the inner cooling line and/or the outwardly directed lamellae extend radially straight from the inner cooling line outwards towards the housing wall, and in each case run in the longitudinal direction of the housing.

5. The desublimator of claim 1, wherein the inwardly directed lamellae and/or the outwardly directed lamellae are arranged helically.

6. The desublimator of claim 3, wherein each of the length portions is coolable and heatable independently of one another.

7. The desublimator of claim 1, wherein a radially free end of a lamella of the inwardly directed lamellae is arranged directly opposite to a radially free end of a lamella of the outwardly directed lamellae.

8. The desublimator of claim 1, wherein a surface area of the inwardly and outwardly directed lamellae increases from the inlet end of the housing to the outlet end of the housing by a factor of the surface area greater than 1 and smaller than 10.

9. The desublimator of claim 1, wherein there are at least two successive length portions in the direction of flow of the gas mixture, the number of lamellae increasing from length portion to length portion.

10. The desublimator of claim 1, wherein the inwardly directed lamellae have at least two different heights, a height to be measured radially inwards starting from the housing wall, and a height to be measured radially outwards starting from the inner cooling line.

11. The desublimator of claim 9, wherein a height of the inwardly and outwardly directed lamellae varies between the successive length portions to avoid the formation of corridors between radially free ends of the lamellae.

12. The desublimator of claim 1, wherein an inside diameter of the housing amounts to 100 mm to 1000 mm.

13. The desublimator of claim 1, wherein a cylindrical inner space is surrounded by the housing wall.

14. A desublimation arrangement with a plurality of desublimators according to claim 1, comprising:
 a first group of the desublimators arranged in parallel connection and configured to receive the gas mixture, and
 at least one further group of the desublimators arranged in parallel connection and configured to receive the gas mixture,
 wherein each of the groups is further configured for alternately recovering products by desublimation and subsequently melting down the already recovered product by a change of pressure and/or an increase of temperature, having an actuator allowing for the alternate delivery of the gas mixture to the respective group of desublimators.

15. The desublimation arrangement according to claim 14, wherein the plurality of desublimators are arranged in series connection, and each desublimator of the plurality of desublimators is configured to receive a gas stream from an upstream desublimator to a downstream desublimator.

16. A discontinuously operating desublimator for the recovery of products from gas mixtures, the desublimator comprising:
 a housing having a housing wall;
 inwardly directed lamellae which are arranged on an inside of the housing wall and configured to be cooled, for the desublimation of the product, by a cooling medium which is conducted through ducts on the housing wall,
 wherein the housing is cylindrical, and is configured to allow the gas mixture to flow through in a longitudinal direction,
 wherein at least one inner cooling line is arranged in the longitudinal direction in the housing and over an entire length of the housing, the inner cooling line having outwardly directed lamellae that are arranged spaced apart over a circumference of the inner cooling line in a circumferential direction of the inner cooling line,
 wherein each of the outwardly directed lamellae are fixed to the inner cooling line in the longitudinal direction of the housing,
 wherein the number of inwardly directed lamellae and/or of outwardly directed lamellae increases from an inlet end of the housing to an outlet end of the housing, and
 wherein the inwardly directed lamellae have at least two different heights, a height to be measured radially inwards starting from the housing wall, and a height to be measured radially outwards starting from the inner cooling line.

\* \* \* \* \*